United States Patent [19]

Gibson

[11] 3,842,199

[45] Oct. 15, 1974

[54] TELEPHONE IMAGE TRANSMISSION SYSTEM

[75] Inventor: John James Gibson, Princeton, N.J.

[73] Assignee: RCA Corporation, New York, N.Y.

[22] Filed: May 26, 1972

[21] Appl. No.: 257,412

[52] U.S. Cl. ........... 178/6.8, 178/DIG. 3, 179/2 TV

[51] Int. Cl. ........................................... H04n 7/12

[58] Field of Search .................... 178/DIG. 1, 6, 6.8; 179/2 TV

[56] References Cited

UNITED STATES PATENTS 2,895,005 7/1959 Kock et al. ....................... 179/2 TV 3,061,670 10/1962 Oster et al. .................... 178/DIG. 3

*Primary Examiner*—Howard W. Britton

*Attorney, Agent, or Firm*—Eugene M. Whitacre; Charles T. Brodsky

[57] ABSTRACT

A system capable of transmitting still television pictures of three-dimensional objects over communications channels such as long-distance unequalized voice-grade telephone lines is described, and in which distortion in a reproduced image due to adjacent sample interference is reduced by transmitting such samples at a rate reduced from the normal 60Hz vertical driving rate so successively transmitted samples will appear geographically adjacent in the picture display.

8 Claims, 7 Drawing Figures

| SCAN LINE NUMBER | SAMPLING ORDER |
|---|---|
| 1 | 1 |
| 264 | 362 |
| 2 | 198 |
| 265 | 34 |
| 3 | 395 |
| 266 | 231 |
| 4 | 67 |
| 267 | 428 |
| 5 | 264 |
| 268 | 100 |
| 6 | 461 |
| 269 | 297 |
| 7 | 133 |
| 270 | 494 |
| 8 | 329 |
| 271 | 165 |
| 9 | 2 |
| 272 | 363 |
| 10 | 199 |
| 273 | 35 |
| 11 | 396 |
| 274 | 232 |
| 12 | 68 |
| 275 | 429 |
| 13 | 265 |
| 276 | 101 |
| 14 | 462 |
| 277 | 298 |
| 15 | 134 |
| 278 | 495 |
| 16 | 330 |
| 279 | 166 |
| 17 | 3 |
| • | • |
| • | • |
| • | • |
| • | • |
| • | • |
| 524 | 132 |
| 262 | 493 |
| 525 | 323 |
| 263 | 164 |

*Fig. 6.*

| SCAN LINE NUMBER | SAMPLING ORDER |
|---|---|
| 1 | 1 |
| 264 | 2 |
| 2 | 3 |
| 265 | 4 |
| 3 | 5 |
| 266 | 6 |
| 4 | 7 |
| 267 | 8 |
| 5 | 9 |
| 268 | 10 |
| 6 | 11 |
| 269 | 12 |
| 7 | 13 |
| 270 | 14 |
| 8 | 15 |
| 271 | 16 |
| 9 | 17 |
| 272 | 18 |
| 10 | 19 |
| 273 | 20 |
| 11 | 21 |
| 274 | 22 |
| 12 | 23 |
| 275 | 24 |
| 13 | 25 |
| 276 | 26 |
| 14 | 27 |
| 277 | 28 |
| 15 | 29 |
| 278 | 30 |
| 16 | 31 |
| 279 | 32 |
| 17 | 33 |
| • | • |
| • | • |
| • | • |
| • | • |
| • | • |
| 524 | 522 |
| 262 | 523 |
| 525 | 524 |
| 263 | 525 |

*Fig. 7.*

TELEPHONE IMAGE TRANSMISSION SYSTEM

FIELD OF THE INVENTION

This invention, in general, relates to apparatus in which an object scene is televised and converted to a video signal representative thereof, in which that signal is then processed for application to a voice-quality communications link as an audio signal, and in which the audio signal, after being transmitted and received along the link is processed back to a video signal to be reproduced as the scene viewed. Such a system will be seen to make possible the inclusion of television-type picture information as part of a duplex telephone communications link, using standard voice bandwidth facilities for transmission of essentially video information and standard television sets for viewing. Where the object scene is that of a moving sequence, a storage system of the general type described in pending application Ser. No. 152,746, filed June 14, 1971, now U.S. Pat. No. 3,740,465, can be used to provide a television frame-at-a-time transmission capability to achieve the video-via-telephone line communication without requiring the signal bandwidth that would otherwise be employed if full motion pictures were to be transmitted.

SUMMARY OF THE INVENTION

As will become clear hereinafter, a television camera viewing a moving scene provides a video signal to an information storage unit in which one video frame is essentially frozen. The single frame is then coupled to a first processing stage which converts the video signal int an audio frequency signal capable of being transmitted over the voice-grade communications link, for example. Upon initiating transmission, the stored video frame is divided into more than 100,000 picture elements which are transmitted sequentially at the rate of approximately 2,000 elements per second. In particular, the transmitting converter generates an audio signal which has a frequency determined by the brightness level of the picture element, which signal is then transmitted over the communication channel. At the receiving location, a second processing stage converts the audio signal into a pulse having an amplitude proportional to the elemental brightness and having a width which is substantially the same as that of the original video element. Such pulses then turn on the beam of a second storage device at the receiver, which in the case of a storage tube, deposits a charge on its target which is both proportional to the brightness level of the initial video element and which is located on the target at the same geographic location as the original element. After the passing of a 60 second or so transmission time, such storage unit at the receiver will then contain an image representative of that at the transmitter, which can then be viewed as a single video frame on a television monitor.

As will also be seen below, a specific embodiment of the present invention supplies horizontal drive signals to both transmitter and receiver storage units at the same, conventional television horizontal scanning rate. The vertical drive rate is reduced by a factor of 16 from 60 Hz to approximately 4 Hz to keep low any distortion which would result in the reproduced picture because of any adjacent sample interference which may be caused. Such distortion manifests itself as an undesirable "ghosting" in the reproduced image by having, in addition to a principal image, lower brightness ghost images superimposed and located above and below the principal image.

BRIEF DESCRIPTION OF THE DRAWINGS

These and other features of the invention will be more clearly understood from a consideration of the following description taken in connection with the accompanying drawings in which:

FIG. 6 is a table showing the sampling order of the scan lines of FIG. 5 when used with a 1/60 second vertical drive rate at the transmitting location; and FIG. 7 is a table of the sampling order of these scan lines in the system of the present invention where the scanning period is reduced from a 1/60 second vertical drive rate to an approximate ¼ second drive rate.

DETAILED DESCRIPTION OF THE DRAWINGS

Figure 1:
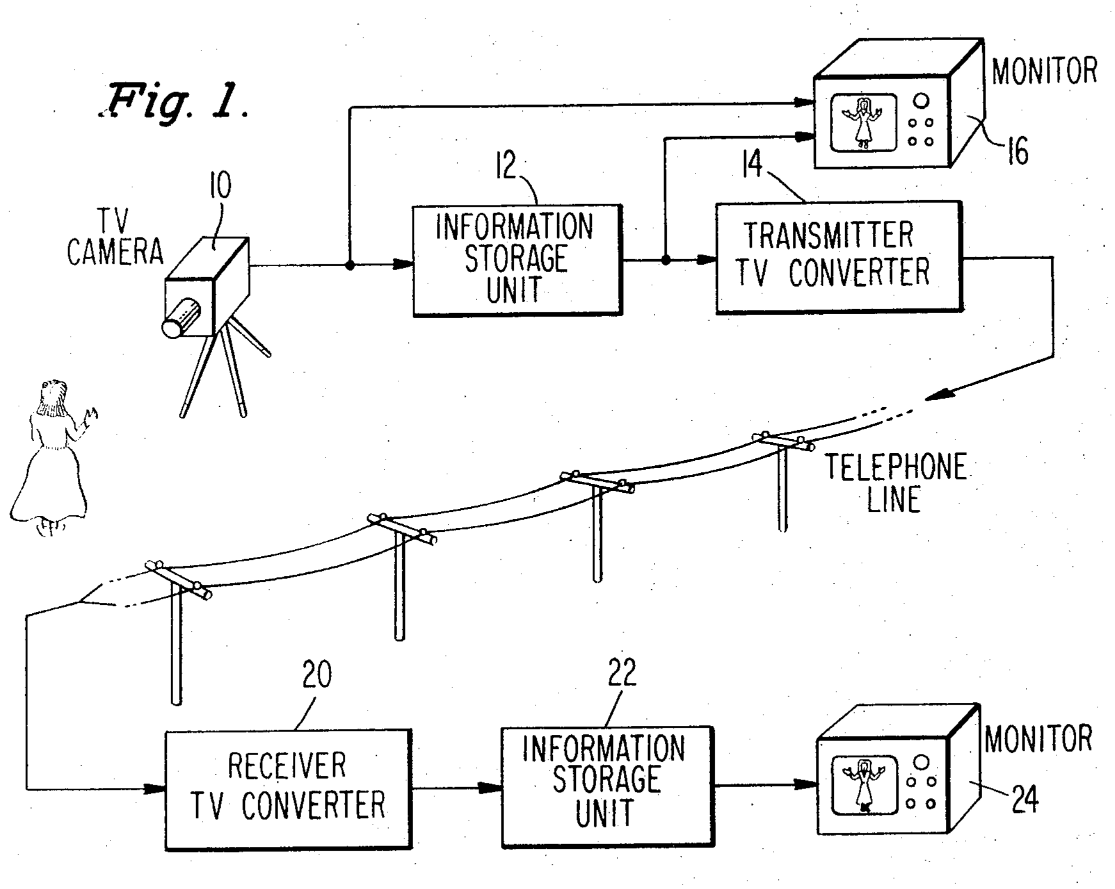
FIG. 1 is a block diagram of a telephone image transmission system capable of transmitting still television pictures of three-dimensional objects over unequalized voice-grade telephone lines.

In FIG. 1, the basic system will be seen to consist of a television camera 10, an information storage unit 12 coupled to the output of the camera 10, and a first converter 14 for changing the video signal applied to it from the storage unit 12 to an audio frequency signal to be applied to the illustrated telephone line, for example. A monitor 16 is also included, having an input terminal coupled to the output of the camera 10 and a second input signal coupled to the output of storage unit 12, by means of which an object scene 18 can be viewed live or a stored scene can be viewed as desired.

Also illustrated at the output of the telephone line is a second converter 20 for receiving the audio signal and for converting it to pulse modulated information representative of both the audio frequency and of the elemental brightness of the picture elements converted by the unit 14 to that form of information content. Such pulse information is applied to a second information storage unit 22 until a full representation of the transmitted image is received, after which a second monitor 24 is activated to display the stored image of the unit 22 to complete the transmission.

In its operation, a subscriber at a domestic terminal, for example, who wishes to send video information to his foreign office might pick up his telephone and place a voice call in the usual manner. He may then thereafter rotate his camera 10 to view the subject material 18, viewing it on his monitor 16. If the subject material is a document or other stationary object, the subscriber may press a transmit button by means of which the video information is sent out directly over the line without first being stored in the information unit 12. If the subject is moving or if it might move after the camera is set, the subscriber may press a second button to view the stopped action frame which would appear on his monitor 16 after coupling to the storage unit 12. Upon pressing the transmit button, then, the picture will be sent out to be received by the foreign office, where the monitor 24 can be adjusted for contrast and brightness in much the same manner as one would adjust his home television receiver.

As will be apparent in this basic arrangement, voice communication would not be possible while the video material is being transmitted; but after the full picture has been received, the system can be designed to automatically switch back to the "voice" mode and the conversation then continued. With a storage unit of the type described in U.S. Pat. No. 3,740,465, the video will remain on the monitor 16 display for a period of up to 10 to 15 minutes and would be erased only for presentation of a succeeding frame. Full voice conversation can continue during this latter no-video transmission period even though the transmitted picture is still being viewed on the monitor 16.

Figure 2:
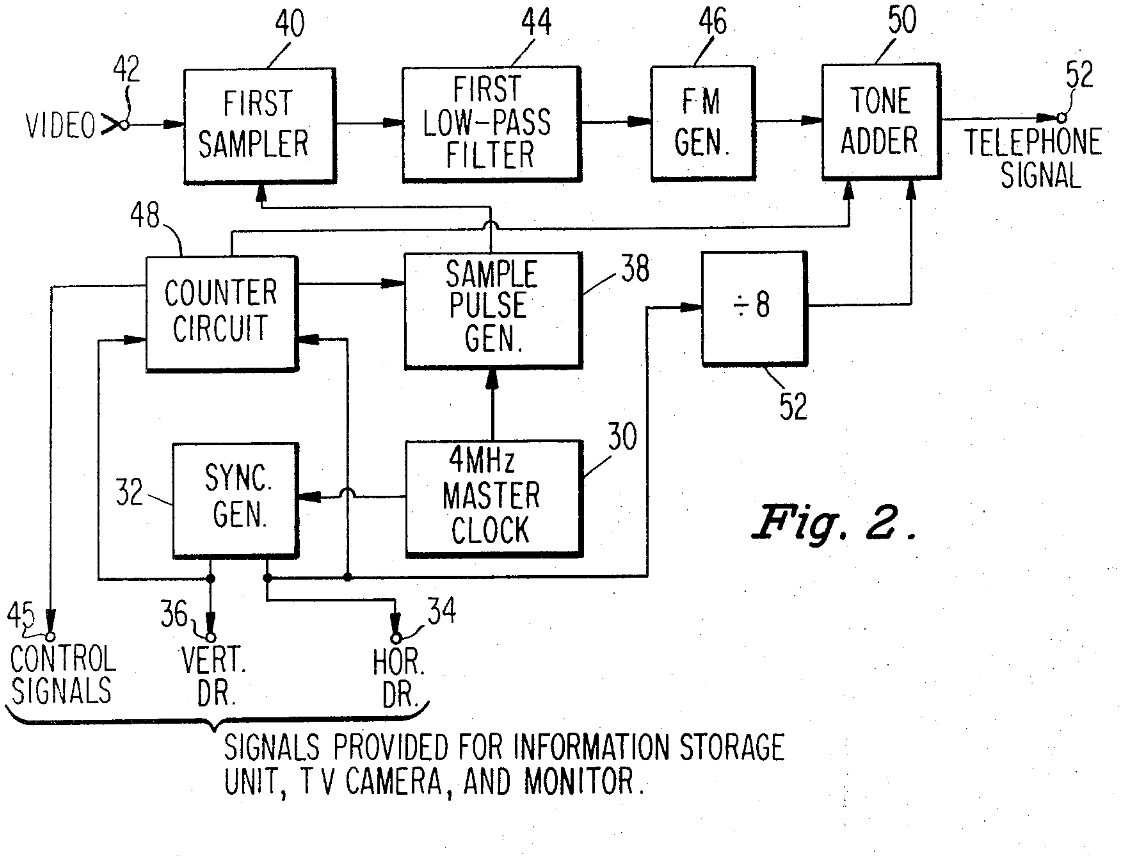
FIG. 2 is a block diagram of the transmitter processing stage for converting the video information into an audio signal having a frequency determined by the brightness content of a discrete picture element.

A block diagram of the transmitter television converter 14 is shown in FIG. 2. A 4 MHz crystal oscillator clock 30, (more specifically oscillating at 4,027,981 MHz), determines all timing, with its oscillations being divided by 256 in a synchronizing generator 32 to produce horizontal drive signals at terminal 34. The clock oscillations so reduced in frequency are further divided by 262-½ to produce vertical drive signals at terminal 36. The horizontal and vertical drive signals developed at these two terminals are used to operate the television camera 10 of FIG 1, to produce the video information from which the frame selected for transmission is stored in the information storage unit 12. As will be described below, when the video information transmission begins, the vertical drive frequency to the storage unit 12 is reduced by a factor of 16 while the vertical deflection rate is also reduced by that same factor of 16. This is done to eliminate any distortions which arise due to the type of communications link employed, although the horizontal driving rate to the storage system is not changed any, so as to optimize the reproduced picture display. Because prolonged reading of a stored image would result in a gradually reduced contrast, the blanking signal to the storage system—as will additionally be described—is also changed during transmission to blank the electron beam during the lines which are not sampled.

Figure 3:
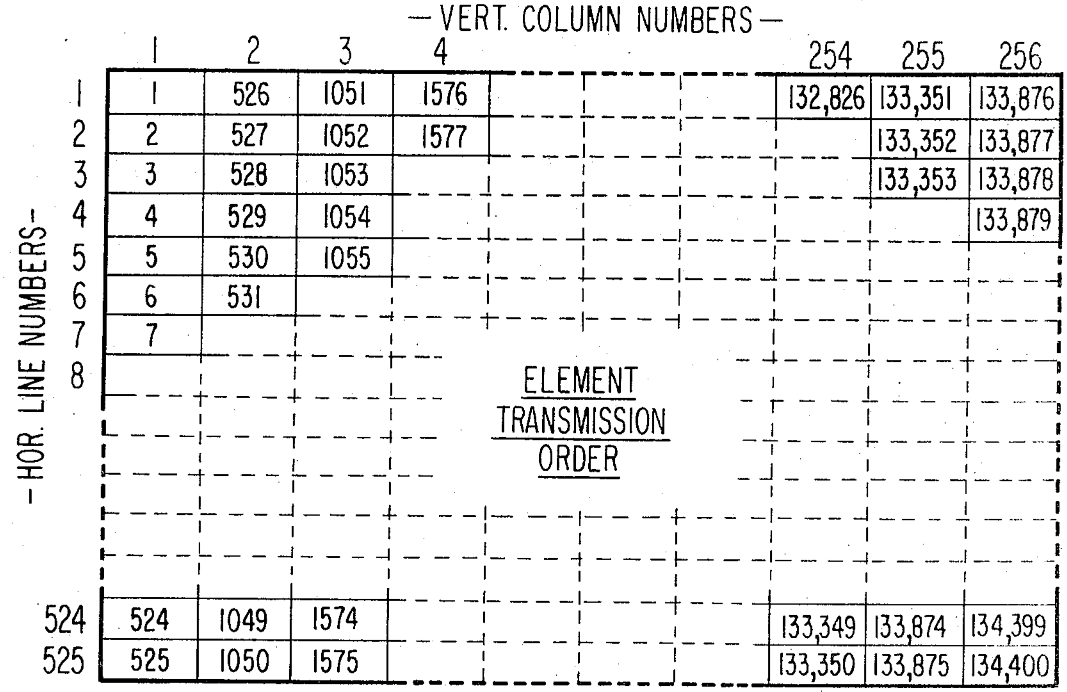
FIG. 3 is a diagram showing the order in which the picture elements are converted to audio frequency signals for transmission.

The video frame stored by unit 12 is arranged to be divided into 525 horizontal lines and 256 vertical columns, as shown in FIG. 3. This matrix of 134,400 elements of information (each element possessing a gray level) is transmitted, column by column, starting at the top left of the matrix—with each column of 525 lines requiring 1/3.75 seconds for transmission, i.e., a transmission rate of 1968.75 elements/second. The modulating signal is developed from the stored image video by sample-and-hold techniques in which the output signal remains at the gray level of the first element of the column for approximately ½ milliseconds, at which time the output assumes the gray level of the second element of the column, remaining at that level for the next ½ milliseconds, and so on. To reduce transmission time, the elements corresponding to the original television horizontal blanking signal are not transmitted; because this horizontal blanking consumes appoximately 15 percent of a transmitted picture, the image transmission time in this arrangement will then be reduced by this percentage.

In FIG. 2, development of this sample-and-hold output is effectuated by a sample pulse generator 38 coupled to the output of the master clock 30, and in turn controlling a first sampler unit 40 to hold for this ½ millisecond or so interval the various ones of the video elements applied to it from the storage unit 12 at its input terminal 42. This sample-and-hold output signal is then filtered by an active 1 KHz low-pass filter 44 and applied in turn to a frequency modulator generator 46. Such generator 46 is arranged to provide an output signal of 2.2 KHz frequency for a video element of minimum (i.e., black) brightness level, a frequency of 1.2 KHz for a video element of maximum (i.e., white) brightness level, and a frequency which varies linearly in accordance with the brightness of the individual elements between these frequency extremes for gray signal components.

The division of the video frame of FIG. 3 into the 134,400 matrix is accomplished by identifying the 256 columns within each of the 525 horizontal lines illustrated. Since the horizontal synchronizing signal is derived by dividing the 4 MHz master clock 30 by 256, then each horizontal line contains 256 master clock cycles which can readily identify each of the 256 columns within the individual line. Any element in the matrix array can then be precisely located by specifying both the horizontal line which contains the element, and, also, the clock cycle along that line.

To produce this stepping from column to column every 1/3.75 seconds beginning at the left of a video frame, the horizontal rate and vertical rate pulses are supplied to a counter circuit 48 whose output is compared with that of the master clock 30 in pulse generator 38 to generate the sampling signal for the sample-and-hold circuit 40. During the time of the first 8 television frames, 8/30 seconds, the sample pulse is made to occur during the first master clock cycle along the television lines. During the second group of 8 television frames, the sample pulse is made to occur, instead, during the second master clock cycle along these lines. During the third group of 8 television frames, likewise, this pulse occurs during the third master clock cycle, and so forth. Every 1/3.75 seconds, therefore, a sample pulse is provided, clocking successively through each of the 256 column interval positions along the lines.

Figure 4:
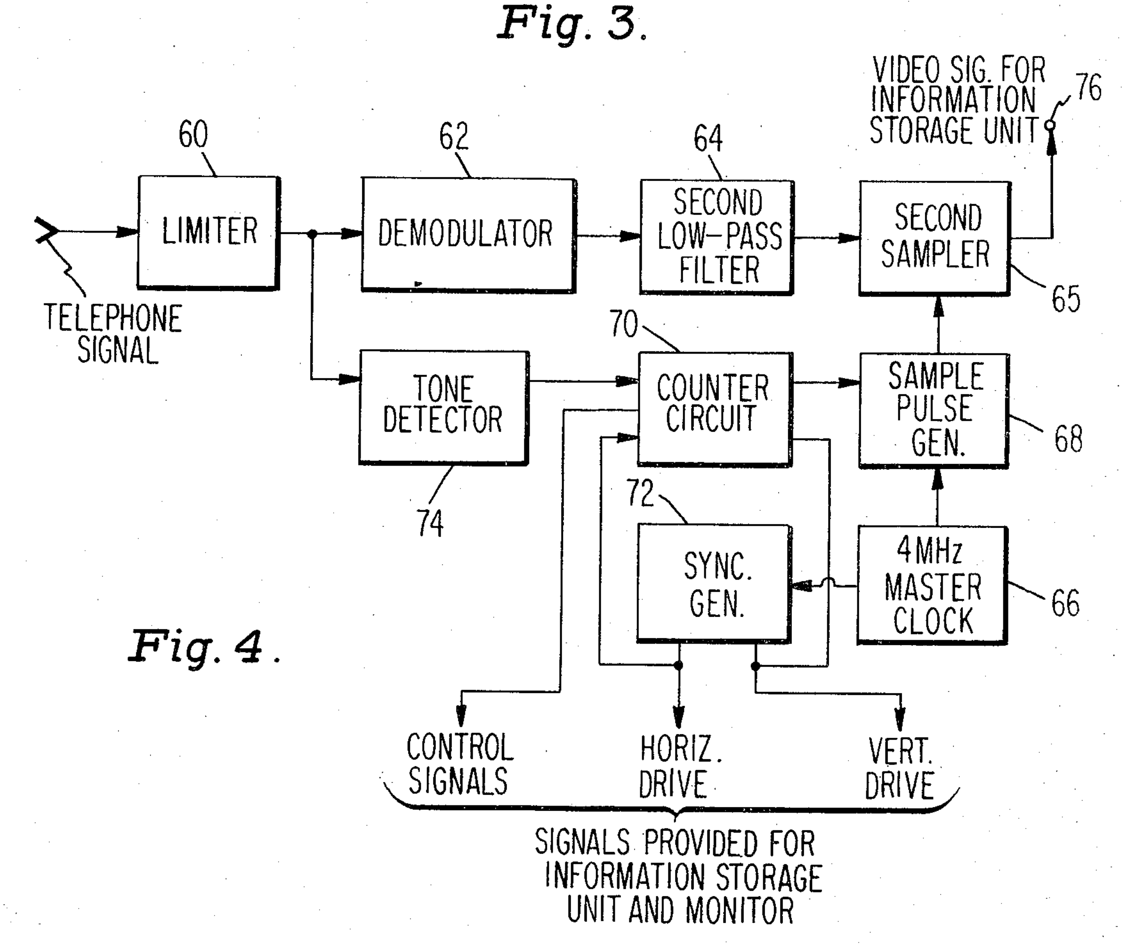
FIG. 4 is a block diagram of the processing stage at the receiver for converting the audio signals into pulse information having an amplitude content proportional to the brightness level of the picture element and a width substantially the same as that of the element transmitted.

As will be apparent to those skilled in the art, it becomes necessary for the receiving unit to know the rate at which successive elements are transmitted and, also, the order in which transmission occurs. If the rate and order are specified as standards, then only the starting time need be transmitted in order for each individual picture to provide synchronized operation. The system as envisioned in FIG. 1 and as more particularly described in FIGS. 2 and 4 is designed to transmit at a rate of 1 element every 8 horizontal line intervals, the reason for which will be more fully explained below. The interval timing, in addition, is in accordance with color television standards, ith the master clock frequency being 512/455 of the color subcarrier frequency, 3.57955 MHz—in other words, 4.027981 MHz. Such starting time information is furnished by transmitting a known tone burst at the beginning of each transmission, by providing an output from counter circuit 48 to an adder 50, along with the frequency modulated signal developed by the generator 46. Also coupled to the adder 50 is the output signal from a "divide by 8" circuit 52, which, when coupled to receive the horizontal driving rate signal, enables the sample pulse to occur during its 8 television frame intervals, or appropriate column. As indicated, the output of the adder 50 is supplied at terminal 52 to the telephone line for transmission and, for such purposes, acoustic and induction input/output devices as well as standard telephone company data couplers have been used for generating the above described tone burst.

The receiver television converter 20 of FIG. 1 is more fully illustrated in FIG. 4, where the received frequency modulated signal from the telephone line is applied to a limiter 60 and demodulator 62 in order to reproduce the original modulating waveform. In particular, the output signal from the demodulator 62 is coupled through a second low pass filter 64 to be sampled in a second sample-and-hold circuit 65 which is controlled in much the same way as at the transmitter. Thus, a nominal 4 MHz master clock 66 provides an output to a sample pulse generator 68 for comparison with a pulse from a counter circuit 70 which is derived from applied horizontal and vertical drive rate signals developed by a synchronizing signal generator 72 after dividing down the applied 4 MHz clock signal. A tone detector 74 couples to the output of limiter 60 to control the start time for generating the sample pulse to be applied to the unit 65.

The output signal from this second sampler 65 comprises a train of amplitude modulated pulses which are spaced approximately 1/2 milliseconds apart, corresponding to the audio signal transmission rate of a telephone line having a 2 KHz bandwidth. Every 8 television frame intervals, 8/30 seconds, a column of video elements will be completed and the position of the generated pulses step 1/3.75 seconds to the right, across the picture. Each developed pulse therefore represents the video output of one element of the original 134,400 matrix array, with the amplitude of each pulse being proportional to the gray level of the matrix element it represents. These output pulses at terminal 76 are then used to modulate the beam current in a storage tube unit (such as the information storage unit 22 of FIG. 1), to turn on the beam only when pulses are present. With the normal horizontal and 1/16th normal vertical deflection frequency (60/3.75) to be described below, the pulses reconstruct the original matrix charge pattern on the target. When the transmission is completed, normal reading of the stored image can reproduce the original television video signal detail.

As noted above, master timing at the receiver is produced with a nominal 4 MHz crystal clock which may be identical to the transmitter clock unit. The input signal from limiter 60 is analyzed with band-pass circuitry to detect the presence of the starting burst tone, which upon recognition, causes the sampling and storing of the video pulses to begin.

In one construction of the system as thus far described, a high degree of reliability and quality in transmitting pictures over voice grade audio channels has been demonstrated. Both unequalized home type telephone lines have been employed, as well as unmodified type Citizen's Band transceivers, to provide the communications links. Substantially little interference has been noted in the telephone supervisory control signals transmitted, and little effect has been noted on the frequency response, crosstalk, group delay or frequency translation offset characteristics of the telephone line. Vertical resolution at the end of some 6,000 miles of telephone circuits have been measured at approximately 340 lines while resolution in the horizontal direction was measured to be approximately 200 lines per picture width. Such resolution was noted to be roughly equivalent to that of television equipment having a 2 MHz video bandwidth. The gray scale and signal-to-noise ratio of the transmitted image was determined to be essentially that of the associated information storage unit employed—for example 7 gray levels and a 36 db signal-to-noise ratio.

Figure 5:
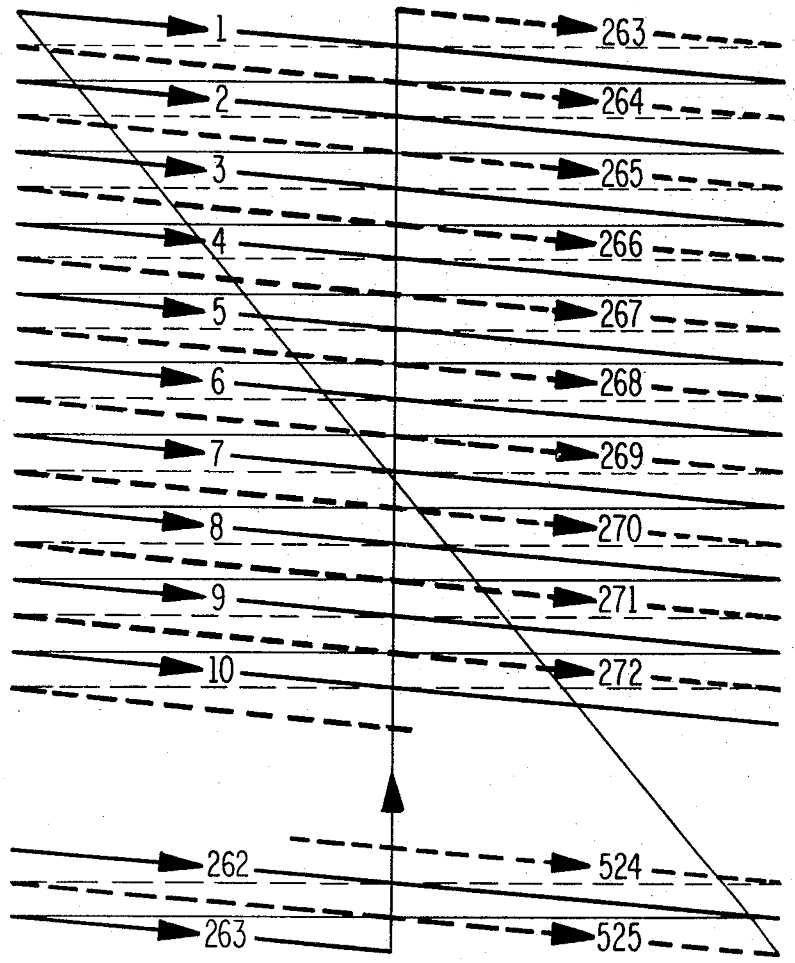
FIG. 5 illustrates the numbering of horizontal scan lines and their location in the frame of a conventional television system.

As was previously mentioned, the system of the present invention operates with an effective vertical scanning rate reduced from its conventional 60Hz to 1/16 that rate. The reason for this can be best understood by referring to FIGS. 5 and 6. More specifically, FIG. 5 shows the scanning raster of conventional broadcast television with an infinitely fast retrace at the leading edge of the horizontal synchronizing pulses. The convention for line numbering is also illustrated. Scanning starts with line 1 in the upper left hand corner with the coincidence, on odd fields, of the leading edges of horizontal and vertical synchronization. A 525 line frame consists of two interlaced fields of 262.5 lines each, with the line rate being approximately 15.75kHz and with the field rate being 60Hz. In NTSC standards, 8 percent of the lines, i.e., 42 lines per frame, are in the vertical blanking interval while 16.67 percent of each line is in the horizontal blanking interval.

In one embodiment of the invention, the bandwidth of the telephone line employed was of the order of 1kHz, so that when this communication link was employed to transmit television type data, the video sampling rate was limited to approximately 2kHz. A 2kHz rate (as compared to the 15.75 kHz line scanning rate) means, therefore, that the first sample of a column to be transmitted as described above would be reproduced, when received, in television line No. 1, the second sample would be reproduced in television line No. 9, the third sample in television line No. 17, etc. The thirty-fourth sample would occur in line 265 which, as will be seen from FIG. 5, is geographically situated between television lines No. 2 and No. 3. Utilizing the normal 1/60 second vertical scanning rate, the order in which transmitted television samples would be reproduced at the receiver location is shown in FIG. 6, where it will be noted that the first and second video elements transmitted would be located on lines No. 1 and No. 9, respectively, but would actually be separated by some 15 scan lines. This 15 lines represents 1/33 of the picture height, and would make any distortion which produces adjacent sample interference result in an undesirable "ghosting" or "echoing" of these 15 lines in the received picture. This "ghosting" would visually manifest itself by producing, in addition to the principal image, lower brightness ghost images superimposed and located 1/33 picure heights above and below. As the distortion increases, additional "ghosts" would appear with the same vertical separation—while under some distortion conditions, a particular "ghost" might disappear while another might be intensified. As will be readily appreciated, such "ghosting" or "echoing" results from the inherent characteristics of the audio communications link and filter circuits employed in that their characteristic delays will not only permit a second, successive transmitted video sample to be received and eventually reproduced, but would also cause some of the immediately preceding, first transmitted video sample to be reproduced as well.

Besides requiring a delay equalization for the telephone or other communications channel to optimize the display of transmitted video information, it was noted that other measures should be taken in order to substantially eliminate this type of distortion. For example, it was determined that the sample and hold circuits employed should not "hold" for a time interval greater than 1/5 sample period. It was also noted that both low-pass filters 44, 64 whould be phase equalized and that the sampling pulse at the receiver should be accurately located with respect to the demodulated signal waveform. It has been noted that when these four requirements are satisfied, high quality pictures could be transmitted with a system utilizing conventional television vertical scanning rates. When one is preparing a consumer product, on the other hand, these four requirements become quite severe in that the cost of the resultant system increases quite significantly. Not only must expensive circuitry be employed, but the equalization of telephone lines appears to be an extreme problem when one is considering only the sale of a consumer product and not a simple, inexpensive improvement to telephone service.

As FIG. 6 illustrates, the vertical ghosting occurs only because successively transmitted video samples are not reproduced geographically adjacent in the picture display. If they could be made geographically adjacent, then improper sampling, unequalized low-pass filtering, and unequalized telephone lines would only reduce the vertical resolution of the transmitted image, but would not deleteriously introduce distortion into the display. Such geographical location may be accomplished by utilizing the scan line sampling order shown in FIG. 7. The adjacent intersymbol sample interference would then affect only vertically adjacent picture elements (not displaced ones), to substantially eliminate the "ghosting" and replace it with a slight "fuzziness" which slightly lowers the vertical resolution obtainable. To change the system from the one with extremely critical requirements into a system with an easy to satisfy requirement follows the changing of the vertical scanning period employed in the transmission of video information over this telephone channel from 1/60 seconds to approximately 1/4 seconds, specifically, to 1/3.75 seconds. Other than relaxing the vertical requirements, no modifications need be made to the television image converter of FIG. 1, as its horizontal scanning is not changed. With this adjustment, the sample-and-hold circuits may "hold" for the full sample period, the low-pass filters need not be phase equalized, and the timing accuracy between sample pulses at the transmitter and receiver has little meaning as far as system operation is concerned.

With the vertical scanning period thus changed to 1/3.75 seconds, the adjacent symbol transmissions would occur ½ milliseconds apart, or in other words, after scanning and transmitting one line of video information, seven lines occur and pass before the next line is scanned and transmitted. To scan the 525 lines of a reproduced picture would then take approximately 525/2 milliseconds, or approximately the 1/3.75 second rate indicated. By reducing the vertical scan rate in this manner, the bandwidth of the image system can be made to substantially match the bandwidth of the telephone communications link so that the order of image reproduction will match the order in which sample transmissions occur. This is illustrated by the table of FIG. 7.

Because of the 1/3.75 second vertical time employed, the accuracy required for determining the starting time of the transmission is also reduced. With the arrangement noted it becomes only necessary to send a tone or code that is recognized in a time which is short compared to the 1/3.75 second transmission time which, in one embodiment of the system, was made 15 milliseconds. Rather than monitoring the incoming line directly and "looking" for the tone, the output of the limiter circuit 60 used at the receiver was employed to provide the required indication. While it might seem that this use is undesirable because noise, after being limited, could activate the system, such is not, in fact, the case, especially when a very narrow bandwidth filter is employed. Another major advantage is that no synchronization is needed between samples at the transmitter and samples at the receiver.

Two methods of operation can be employed to cause the adjacent samples in the transmission to appear adjacent in the reproduced picture once the vertical scanning rate reduction has been decided upon. In the first method—where it is assumed that only stationary scenes are to be picked up by the camera 10 of FIG. 1 and transmitted to the memory means at the receiver for ultimate display—modifications can be made to operate the camera at the slow 1/3.75 second vertical scan. The transmission to the receiver then occurs at this slow rate where it is stored, for example, on a silicon storage tube in the memory unit 22, but later read out for picture reproduction at the standard 1/60 second vertical rate. In the second arrangement—where it is assumed that the television camera 10 is scanning a live scene and only still picture information is to be transmitted—the camera 10 can be operated at the regular 1/60 second vertical scanning rate with its information stored, for example, on a silicon storage tube in the memory unit 12 prior to transmission; reading from this storage unit 12 is at the slow 1/3.75 second vertical scan rate for transmission and, upon receipt at the second location, the transmitted video information is written at this slower rate into the memory 22, whereafter it is again read out for image reproduction at the regular 1/60 second vertical rate. In both these arrangements, it will be seen that the transmission is at the 1/16 standard vertical rate, with ultimate reproduction being at the normal rate so that conventional broadcast television components can be used throughout the system, all of which work at the standard horizontal frequency.

Such control over the scanning rate of the television camera 10 and/or the information storage unit 12 at the transmitter location is effected at output terminal 45 of FIG. 2 where, according to the mode of operation desired, regulation either of the camera scanning rate or the writing rate onto the information storage unit is regulated. When changing the camera rate, for example, the control signal can vary the frequency of drive pulses to the vertical deflection yoke of the camera in response to the counting of horizontal lines in the counter circuits 48 of FIG. 2. If an information storage unit is employed, on the other hand with the camera operating at the standard vertical rate, then the output signal at terminal 45 will control the writing rate onto the storage element of the memory device. Appropriate switches regulate the action of the counter circuits 48 to provide these output indications in accordance with the mode of operation of the system employed. Similarly, the counter circuit 70 of FIG. 3 provides appropriate output signals to control the writing and reading rate on the receiver information storage unit and on the resultant monitor display.

While there has been described what is considered to be a preferred embodiment of the present invention, it will be readily apparent that modifications may be made by those skilled in the art without departing from the scope of the teachings herein. Thus, whereas the preferred embodiment has been described with a vertical scanning rate of 1/16 the conventional 60 second rate, modifications can be made to reduce the vertical rate to some other fraction or to change the number of lines scanned for any given picture display, and still effect a reduction in the "ghosting" or "echoing" which results because of the characteristics of the components employed in the system. While a 1/16 vertical scanning rate has operated satisfactorily with a 525 line system, it will also be noted that a ⅛ rate could be used in such a system to reduce the intersymbol interference, though not as much as with a 1/16 slow scanning rate system. Vertical resolution is also somewhat reduced, as compared to the 1/16 rate system, but, again, can be improved by adjusting the number of lines transmitted in each columnar segmentation. Additionally, it will be appreciated that the reduction in transmission rate over the audio communications channel will be somewhat dependent upon the sampling rate limit established by the bandwidth characteristics of the link utilized. The scope of the present invention is, therefore, to be read in light of the appended claims hereto.

What is claimed is:

1. An image transmission system comprising:

first means for generating video signal information representative of an object scene scanned under the control of applied line and field rate deflection signals;

an audio frequency communications link having a predetermined bandwidth and accommodating a given signal sampling rate less than said line scanning rate;

second means coupled to an input of said communications link for generating frequency modulated signals over a range of frequencies within the bandwidth of said link;

third means for applying said video signal information into said generator means at a rate comparable to said signal sampling rate for converting successive video samples to frequency modulated audio frequency signals to be transmitted by said communications link from one location to another location; and fourth means for receiving said sample transmissions for reproduction by an image display device, also controlled by line and field rate deflection signals;

with said third means including means to reduce the rate of field control deflection signals in generating said video signal information by one-half the ratio between said given signal sampling and line scanning rates, in transmitting successive samples of said video signal information via said generator means and said audio frequency communications link from said first to said other location.

2. The system of claim 1 wherein said audio frequency communications link includes an unequalized telephone communications line through which frequency modulated audio frequency signals are transmitted at a signal sampling rate substantially twice its bandwidth and ⅛ said line scanning rate and wherein said third means channels successive samples of said video signal information via said generator means to said communications link at substantially 1/16 the field scanning rate of said image display device.

3. The system of claim 1 wherein said first means includes an image pickup for scanning a relatively stationary object scene for conversion to video signal information representative thereof and wherein said third means controls the field deflection rate of said pickup device scanning to substantially that rate which is less than the field scanning rate of said image display device.

4. The system of claim 1 wherein said generation of video signal information representative of an object scene and the reproduction of said information by said image display device are each regulated by said third means to have substantially the same horizontal scanning rate.

5. The system of claim 1 wherein said third means channels successive samples of video signal information to said fourth means at a rate such that said successive samples appear substantially geographically adjacent one another in the reproduced image.

6. The system of claim 1 wherein said audio frequency communications link includes an unequalized telephone communications line through which frequency modulated audio frequency signals are transmitted at a signal sampling rate substantially twice its bandwidth.

7. The system of claim 1 wherein said fourth means includes an information storage unit coupled to said image display device, wherein said storage unit provides stored information signals to said display device at its said field scanning rate, and wherein said third means channels successive samples of video information to be stored in said storage unit at a rate less than said field scanning rate of said display device.

8. The system of claim 7 wherein said first means includes an image pickup device for scanning a relatively moving object scene for conversion to video signal information representative thereof and a second information storage unit for the recording of said video signal information, and wherein said third means applies said video information to the information storage unit of said second means at substantially that rate which is less than the field scanning rate of said image display device.

* * * * *

UNITED STATES PATENT OFFICE
CERTIFICATE OF CORRECTION

Patent No. 3,842,199 Dated October 15, 1974

Inventor(s) John James Gibson

It is certified that error appears in the above-identified patent and that said Letters Patent are hereby corrected as shown below:

Page 1, References cited should read:

| | | | |
|---|---|---|---|
| --3,564,127 | 2/1971 | Sziklai.......... | 178/DIG. 3 |
| 3,284,567 | 11/1966 | Southworth....... | 178/DIG. 3 |
| 2,878,310 | 3/1959 | Becker........... | 179/2 TV |
| 2,955,159 | 10/1960 | Jones, Jr........ | 178/DIG. 3 |
| 2,909,600 | 10/1959 | Becker........... | 178/DIG. 3 |
| 2,895,005 | 7/1959 | Kock et al....... | 179/2 TV |
| 3,061,670 | 10/1962 | Oster et al...... | 178/DIG. 3-- |

Col. 1, line 34: "int" should read --into--.
Col. 3, line 30: "4,027,981" should read --4.027981--.
Col. 4, line 67: "ith" should read --with--.

Claim 3, Col. 10, line 22: after "pickup" insert --device--.

Signed and sealed this 6th day of May 1975.

(SEAL)
Attest:

RUTH C. MASON
Attesting Officer

C. MARSHALL DANN
Commissioner of Patents
and Trademarks

RM PO-1050 (10-69)
O 6|72

USCOMM-DC 60376-P69
☆ U.S. GOVERNMENT PRINTING OFFICE : 1969 O—366-334